United States Patent Office 2,710,769
Patented June 14, 1955

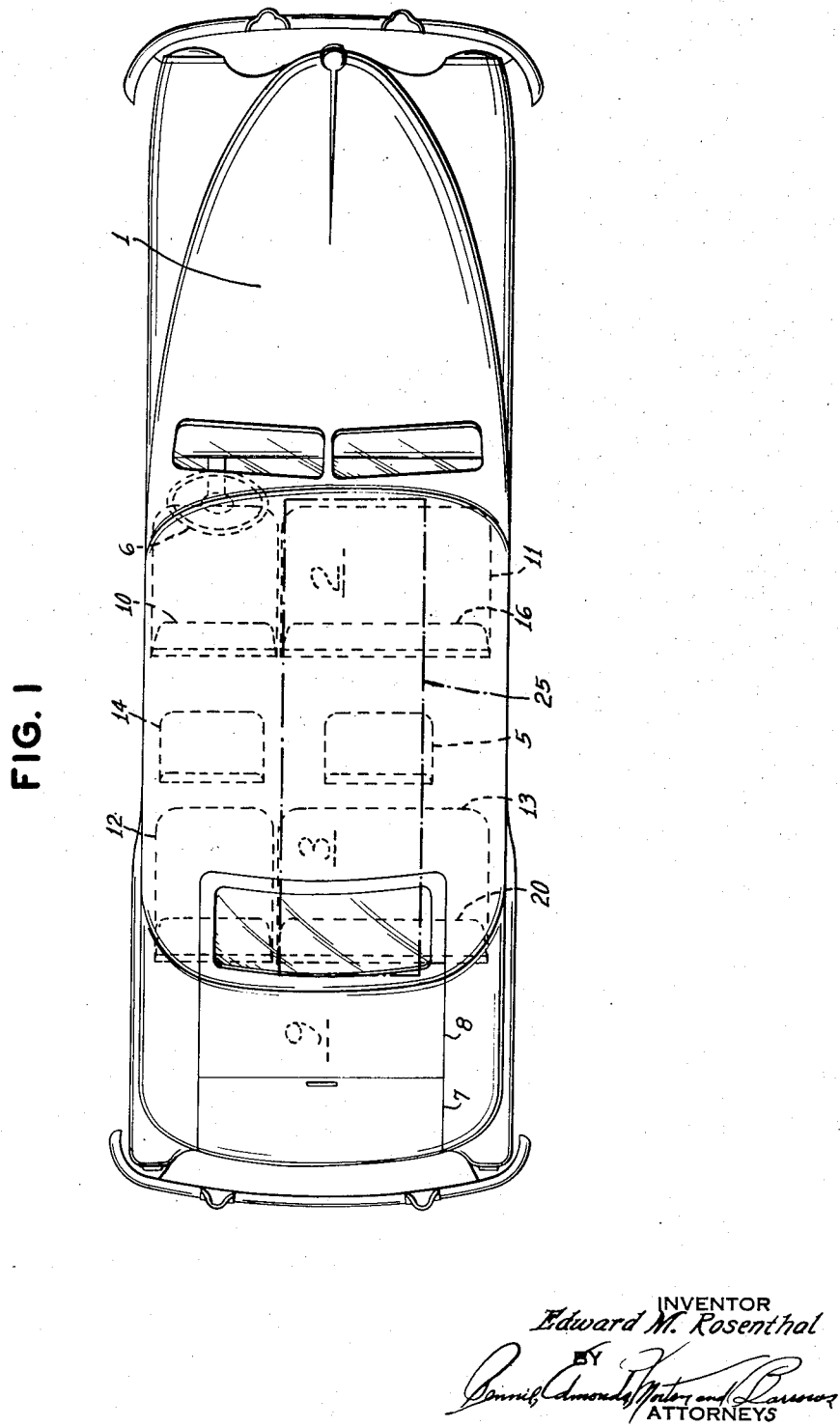

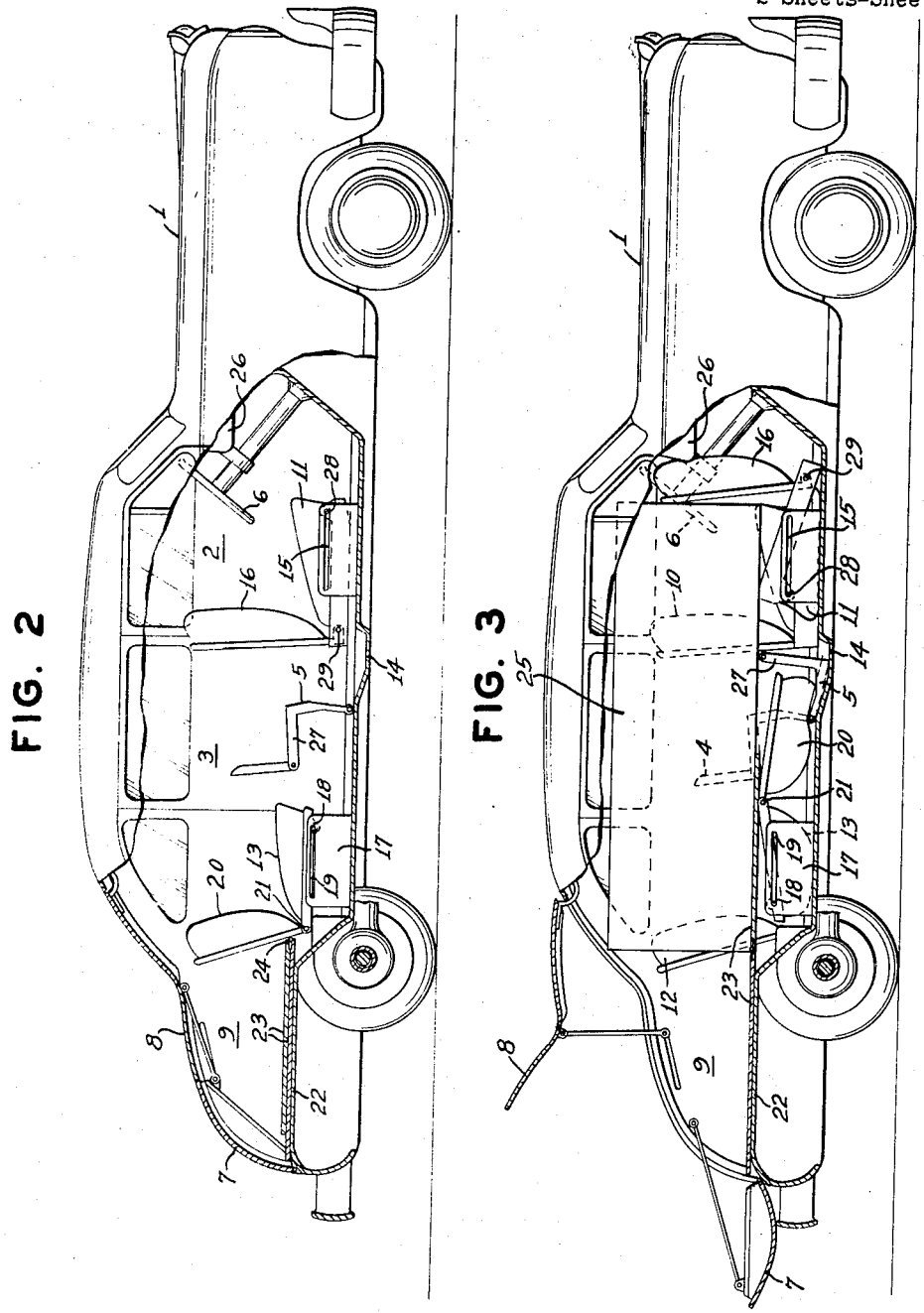

2,710,769

CONVERTIBLE PASSENGER AUTOMOBILE AND HEARSE BODY

Edward M. Rosenthal, Chappaqua, N. Y.

Application June 1, 1950, Serial No. 165,459

1 Claim. (Cl. 296—17)

This invention relates to dual purpose vehicles and especially to sedan-type passenger automobiles which are readily convertible into dignified casket carriers.

I am aware that the problem posed by excessive investment in hearses of the single-purpose type has long been a recognized one among funeral directors. Moreover, I am aware of a variety of approaches to the problem. None of these existing proposals and constructions has been adopted by the trade and, therefore, funeral directors generally continue to be saddled with an uneconomic investment in single-purpose hearses.

My invention comprises broadly these features: dividing the front and rear seats of a conventional left-hand drive sedan each into a left portion of from 30 to 40% of the seat width and a specially disposable right portion occupying the balance of the seat width; arranging the disposable portion of the rear seat to be capable of manipulation to form a support for a load bearing surface forming a continuation of the luggage compartment floor; and arranging the disposable portion of the front seat to jackknife forward so that its back will form an instrument panel protector and load engaging surface and the whole disposable portion will be far enough forward to accommodate a casket of customary size. Additionally, if the sedan employed is of the usual 7-passenger type equipped with jump seats, it is part of my invention that the left-hand jump seat be so disposed as to be entirely between the left-hand portions of the front and rear seat and that the right-hand jump seat be so arranged that when folded down its highest portion does not extend above the level of the load bearing surface supported by the right portion of the rear seat. The folded down jump seat may be advantageously arranged to furnish an additional load support. With right-hand drive vehicles, the characteristics of the left and right seating arrangements described are reversed.

It is a principal object of my invention to provide a combination vehicle convertible from passenger carrying sedan to hearse with the minimum of special construction and without marring the normal exterior appearance of the vehicle.

A further object of my invention is to provide for easy loading of the casket.

A still further object of my invention is to provide for seating accommodations for one or two persons in addition to the driver while the vehicle is in service as a hearse.

My invention is described in detail below in connection with the accompanying drawings which illustrate the invention embodied in a seven-passenger left-hand drive sedan of modern American design.

In the drawings:

Fig. 1 is a plan view of a car with the interior seating arrangements indicated in dotted lines and the position of a casket indicated in dash-dotted lines;

Fig. 2 is an elevation partially in section of the car shown in Fig. 1 showing the seats in normal passenger-accommodating position and the rear deck closed; and Fig. 3 is a view similar to Fig. 2, but showing the right-hand portions of the seats in casket accommodating position and the rear deck open.

A sedan, generally designated 1, of the seven-passenger type, has a full-width front seat, generally designated 2, a full-width rear seat, generally designated 3, and a pair of jump seats 4 and 5. The steering wheel 6 is located at the left side of the car 1. A double door comprising the downward opening portion 7 and the upward opening portion 8 gives access through the rear of the car 1 to the usual luggage compartment, generally designated 9 back of the rear seat 3.

As shown in Fig. 1, the front seat 2 is divided into two portions, a left portion 10 and a right portion 11, and the rear seat 3 is similarly divided into two portions, a left portion 12 and a right portion 13. The width of the portions 11 and 13 is to the width of the portions 10 and 12 approximately as sixty is to forty. The jump seat 4 is arranged to be entirely between portions 10 and 12 and not at all between portions 11 and 13.

In Fig. 2, the seats are shown in their passenger carrying position. The jump seat 5 is unfolded up out of its floor well 14. The right portion 11 of the front seat 2 is adjusted on its slide 15 to a position of alinement with left portion 10. The back 16 of left portion 11 is upright.

Right portion 13 of rear seat 3 is mounted at each end on seat supporting brackets 17 of which only the right hand one can be seen. A front pivot 18 of seat portion 13 slides in slot 19 in the top of bracket 17. Back 20 of rear seat portion 13 is attached by means of a rear pivot 21.

In the particular embodiment shown, the floor 22 of luggage compartment 9 is, over the portion thereof behind right seat portion 13 covered with a load bearing skid floor 23 which is hinged at 24 so as to be entirely within compartment 9 when folded back on itself, as shown in Fig. 2.

In Fig. 3, the seats are shown in their folded-down position to accommodate the casket 25. The outline in plan of casket 25 is indicated in dash-dotted lines in Fig. 1. The upper tail gate 8 raises high enough to permit the easy, dignified loading of casket 25 across the flat upper surface of lower tail gate 7 when open as shown in Fig. 3.

To accommodate casket 25, right portion 11 of front seat 2 is pivoted about its front pivot 28 so that the seat cushion thereof is upside down and then slid as far forward in slide 15 as it will go. Back 16 turns about hinge 29 and is positioned against instrument panel 26. The back of seat back 16 serves as a forward stop and partial steady rest for casket 25. This construction permits adequate lengthwise space for a normally dimensioned casket within the confines of a conventional sedan body shell. Left portion 10 of front seat 2 remains in position to accommodate the driver behind steering wheel 6. Jump seat 5 is folded down into well 14. The dimension of seat member 27 of jump seat 5 may well be so selected that it serves as an additional support and steady rest for casket 25. Right rear seat portion 13 is pivoted upward about pivot 18 which is slid all the way to the rear in slide 19 and at the same time seat back 20 is folded away from seat 13 about pivot 21. The whole right portion of rear seat 3 may thus lie on the car floor, it being so proportioned as to serve as a support for the portion of skid floor 23 folded forward about hinge 24, making the whole of floor 23 a continuous supporting surface for casket 25. The left portion of rear seat 3 remains in seating arrangement to accommodate an attendant and left-jump seat 4 may be raised, as shown in dotted lines in Fig. 3, to accommodate a second attendant.

While I have described my invention in terms of the specific embodiment illustrated, it will be readily apparent to those skilled in the art of custom automobile coachwork that many equivalent structural variations in the specific devices for manipulating the seats can be employed without departing from the principles of the invention. Moreover, although the need for the invention seems greatest in the funeral field, a similar structure could be advantageously used as a police vehicle to provide emergency ambulance accommodation or as a vehicle for carrying a long load such as pipes and a small crew of men, as in emergency water or gas works service. I do not, therefore, wish to be limited to the specific details of the vehicle illustrated but rather by the appended claim.

I claim:

A vehicle body construction including, in combination, a sedan body shell, a full width front seat in said shell, said front seat being divided into a front, driver's-side portion of from 30 to 40% of the width and a remaining front portion, said remaining front portion being displaceable forward and downward independently of said front, driver's-side portion, a luggage compartment within said shell at the rear extremity thereof, a full width rear seat in said shell in front of said luggage compartment, said rear seat being divided into a rear, driver's-side portion of from 30 to 40% of the width and a remaining rear portion, said remaining rear portion being displaceable forward and downward independently of said rear, driver's-side portion to occupy a position generally below the level of the floor of said luggage compartment, a rear loading opening into said luggage compartment, and means being provided supported by said remaining rear portion in its displaced position for supporting a superposed load; said shell containing an instrument panel and the remaining portion of the front seat including a supporting slide, an invertable seat frame pivoted to and slideable on said slide and a back frame hinged to said seat frame whereby said remaining portion is displaceable forward and downward by inverting said seat frame by rotating it forwardly about its pivot while maintaining said back frame substantially vertical, sliding the whole to the front limit of the shell and folding down the seat back to rest upon said instrument panel.

References Cited in the file of this patent

UNITED STATES PATENTS

| | | |
|---|---|---|
| 1,211,108 | Douglas | Jan. 2, 1917 |
| 1,627,833 | Chandler | May 10, 1927 |
| 1,656,931 | Wolfermann | Jan. 24, 1928 |
| 1,668,167 | McKenna | May 1, 1928 |
| 1,832,767 | Dameron | Nov. 17, 1931 |
| 2,138,826 | Arntzen | Dec. 6, 1938 |
| 2,152,505 | Stuart et al. | Mar. 28, 1939 |
| 2,502,061 | Radford | Mar. 28, 1950 |
| 2,638,374 | Willson | May 12, 1953 |

FOREIGN PATENTS

| | | |
|---|---|---|
| 438,721 | France | Mar. 22, 1912 |
| 601,337 | France | Nov. 28, 1925 |